H. A. RYTHER.
CHANGE SPEED GEARING.
APPLICATION FILED JULY 1, 1912.
1,064,012.
Patented June 10, 1913.
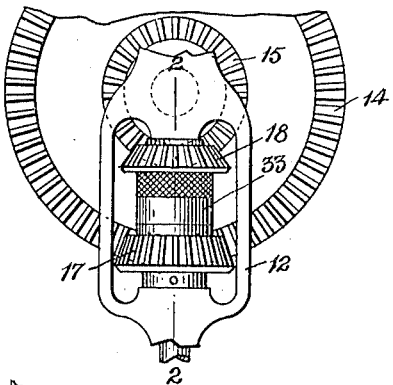
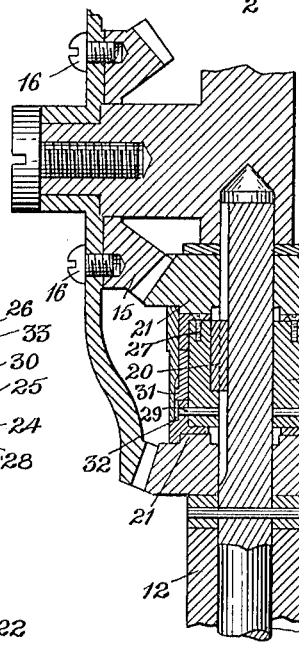
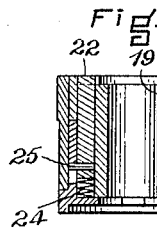
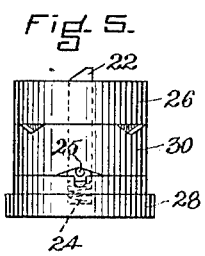
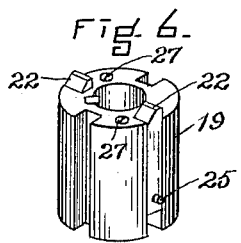
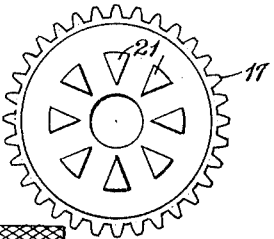
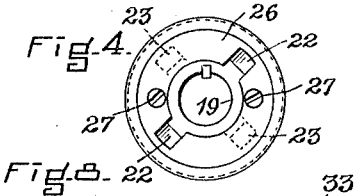
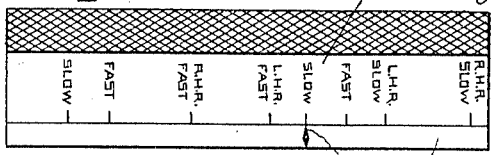
WITNESSES.
F. R. Ronlstone
O. N. Pezzetti
INVENTOR.
Henry A. Ryther
by Wright Brown Quimby May
attys.
COLUMBIA PLANOGRAPH CO., WASHINGTON, D. C.

UNITED STATES PATENT OFFICE.

HENRY A. RYTHER, OF MONTAGUE, MASSACHUSETTS, ASSIGNOR TO MILLERS FALLS COMPANY, OF MILLERS FALLS, MASSACHUSETTS, A CORPORATION OF MASSACHUSETTS.

CHANGE-SPEED GEARING.

1,064,012.      Specification of Letters Patent.      Patented June 10, 1913.

Application filed July 1, 1912. Serial No. 706,863.

*To all whom it may concern:*

Be it known that I, HENRY A. RYTHER, a citizen of the United States, and resident of Montague, in the county of Franklin and State of Massachusetts, have invented certain new and useful Improvements in Change-Speed Gearing, of which the following is a specification.

This invention relates to means for varying the speed of rotation imparted to a spindle or shaft, and in connection therewith to also provide for varying the character of the movement imparted to the spindle or shaft.

The object of the invention is to provide an improved and simplified mechanism which will enable the user to quickly shift the connections so that the spindle or shaft may be given a continuous rotation in either direction at either one of two speeds, or an intermittent rotation in either direction at either one of two speeds. The gearing is designed for use where it is desired that a spindle or shaft shall have imparted to it continuous rotary motion in either direction at a fast speed or a slow speed, or an intermittent rotary motion in either direction at a fast speed or a slow speed.

The invention consists in the construction and combination of parts substantially as hereinafter described and claimed.

Of the accompanying drawings: Figure 1 is a side elevation of the gearing, including a portion of the frame of the mechanism to which the invention is applied; Fig. 2 represents a section on line 2—2 of Fig. 1, on a larger scale; Fig. 3 represents a section through some of the members indicated in the middle portion of Fig. 2, the line of section being different; Fig 4. is a plan view of the parts shown in Fig. 3; Fig. 5 is a side elevation of the parts shown in Fig. 3, omitting the outer sleeve which actuates the cam sleeve; Fig. 6 is a perspective view of the barrel and its sliding pawls; Fig. 7 is a plan view of the lower pinion shown in Figs. 1 and 2; Fig. 8 represents a development of the cam actuating sleeve, said figure indicating also a development of the base ring at the lower end of the said sleeve; Fig. 9 represents a development of the cam sleeve.

Similar reference characters represent the same or similar parts in all the figures.

The frame of the mechanism is indicated at 12, said frame having bearings for a shaft or spindle 13. The frame also provides a support for a compound gear comprising a larger outer member 14 and a smaller inner member 15, the latter being shown as secured to the former as by screws 16.

Loosely mounted on the spindle 13 are two pinions 17 and 18 meshing respectively with the outer and inner series of teeth of the compound gear 14, 15. It will be understood at this point that if the pinion 17 be temporarily connected to the spindle, rotation of the compound gear will impart the higher speed of rotation to said spindle, while if the pinion 18 be temporarily connected to the spindle the motion of rotation that will be imparted to the spindle by the compound gear will be relatively slow. As will be presently described, when one pinion is connected to the spindle, the other one is left free to rotate idly thereon.

Secured to the spindle 13 between the opposing faces of the two pinions 17, 18 is a pawl barrel 19. In the drawings said barrel is shown as secured to the spindle by means of a key fitting a key-way or groove in the side of the spindle. This is merely for convenience in assembling. It is to be understood that the barrel might be secured to the spindle in any other way. The key and key-way shown, however, enable the entire set of members between the two pinions 17, 18 to be removed collectively if the spindle is withdrawn from its bearings.

The opposing faces of the pinions 17 and 18 are formed or provided with ratchet teeth 21. These ratchet teeth are double faced, that is, they consist of sector-shaped projections from the face of each pinion, said projections comprising a circular series, both sides of the projections forming teeth to be engaged by the abrupt sides of the bevel-ended pawls presently described when said pawls are adjusted or controlled for different operations.

Mounted in slideways in the barrel 19 are four pawls, the pawls 22, 22 being diametrically opposite each other and having their ends beveled, as shown by comparing Figs. 4 and 5, this pair of pawls 22, 22 being arranged to coöperate with the ratchet teeth of the pinion 18. For convenience of description the pinion 18 may be referred to as the slow speed pinion, and the pinion 17 as the high speed pinion, the reason for these terms being explained above in connection with the description of the operation of the compound gear. The pawls 23 alternate with the pawls 22, 22, and their beveled ends are arranged and adapted to coöperate with the ratchet teeth of the high speed pinion 17. Each pawl is projected when such movement is permitted, as hereinafter described, by a spring 24 (Fig. 3), and each pawl has an outwardly projecting pin 25 to be engaged by the cam sleeve presently described. To one end of the barrel a cap ring 26 is secured, as by screws 27. To the other end of the barrel a base ring 28 is secured, as by pins 29 (Fig. 2). These connections are such that the cap ring 26 and base ring 28 practically become portions of the barrel in that they are held against rotation relatively to the spindle 13. The base ring 28 has its lower portion enlarged so that the surface thereof will be substantially flush with the outer surface of the actuating sleeve presently described, and said outwardly projecting portion of the base ring 28 is provided with an indicator 34 (Fig. 8) for the purpose presently described.

Mounted on the barrel is a cam sleeve 30, the outer surface of which is substantially flush with the outer surface of the ring 26, said sleeve having a lug 31 which is engaged by a groove 32 in the inner face of the cam-actuating sleeve 33, the connection of said lug and groove being such that all rotative movements of the sleeve 33 are transmitted to the inner sleeve 30. Each edge of the inner sleeve 30 is formed with four depressions, as best shown in Fig. 9, the sides of said depressions forming cams for engaging the pins 25 of the pawls, said pins riding along the straight edges of said sleeve 30 when the latter is being rotatively shifted or adjusted. The structure is such that when a cam depression of the sleeve 30 is opposite a pin 25, the pawl from which that pin projects is free to be acted upon by its spring, so that its beveled end will be projected beyond the end of the carrier barrel.

In order that the user may know the exact point to which the cam ring should be rotated to obtain the particular speed or character of movement that is to be imparted by the compound gear to the spindle, the outer face of the cam actuating sleeve 33 is preferably provided with definite symbols, such as words and marks, which when brought opposite the indicating mark 34 of the stationary ring 28 will indicate that the proper adjustment has been made. Figs. 8 and 9 indicate the relationship of the cam actuating sleeve and the cam ring, it being remembered that the said sleeve and ring must rotate or be adjusted in unison owing to the lug 31 engaging the recess or groove 32, as shown in Fig. 2. When the "R H R—Slow" is opposite the indicator 34 all of the pawls, excepting one of the pair 22, are held withdrawn, and the one pawl 22 which remains projected is the one which is beveled on such side that a rotary reciprocating motion of the compound gear will act through the pinion 18 and the projected pawl 22 to impart to the spindle an intermittent rotation in a right-hand direction, as the gear is moved in one direction, while the said beveled pawl slips over the ratchet teeth 21 of said pinion 18 when moving in the other direction, this operation being termed for convenience "right-hand ratcheting". As the operation takes place only through the slow speed pinion 18, the speed of the intermittent right-hand motion imparted to the spindle will be slow. Adjusting the sleeve 33 until the "L H R—Slow" comes opposite the indicator 34 results in holding all the pawls retracted excepting the other pawl 22, the end of which is beveled in such a direction that it will coöperate in the manner described with the slow speed pinion 18 to produce "left-hand ratcheting", but at a slow speed of movement. Adjusting the sleeve still farther until the point "Fast" comes opposite the indicator 33 results in retracting both of the pawls 22 and permitting both of the pawls 23 to be projected. As each pair of pawls, as has been described, are beveled in opposite directions, the result of the projection of both pawls of a pair is that the pinion adjacent that pair will be locked to the barrel. Consequently when the two pawls 23 have been projected as just described, they engage the teeth 21 of the high speed pinion 17 so that rotation of the compound gear in either direction will impart to the spindle its higher rate of rotation either to the right or left according to the direction of motion given to the compound gear. Adjusting the two sleeves still farther until the next point "Slow" comes opposite the indicator 34 results in retracting both of the pawls 23 and permitting both of the pawls 22 to be projected by their springs, thus locking the slow speed pinion 17 to the barrel and spindle.

It is to be understood that when either pair of the pawls 22, 23 is projected the motion which will then be transmitted by the compound gear to the spindle will be continuous in either direction, but the speed of rotation so imparted will be varied according to which pair of said pawls is so projected.

The next step of adjustment brings "L. H. R.—Fast" opposite the indicator 34 and this results in all of the pawls being retracted excepting one of the pawls 23, and that one pawl which is then projected is the one which is beveled in such a direction that intermittent forward and back motion of the compound gear will impart a "left-hand ratcheting" motion to the spindle, at the higher speed due to the fact that the pawl so projected is coöperating with the pinion 17. The next step of adjustment brings "R. H. R.—Fast" opposite the indicator 34 and this results in projecting the other pawl of the pair 23, which pawl that is so left projected is the one which is beveled in a direction to cause forward and back motion of the compound gear to impart a "right-hand ratcheting" motion to the spindle at the higher speed because of the engagement of the projected pawl with the pinion 17.

Still further adjustments to bring the other marks "Fast," "Slow" opposite the indicator 34 result in projecting either the pair of pawls 23 or the pair of pawls 22 in the manner that has been already described.

It will now be seen that I have combined in compact form a group of elements located between the two pinions 17, 18, which enable all of the changes of motion that may be desired for the spindle to be readily effected, these changes not only controlling the speed of rotation that may be imparted to the spindle continuously in either direction, but the character of the movement imparted to said spindle. The character changes affect the direction of movement when ratcheting, and affect the speed of such ratcheting movement.

I claim:

1. In change speed gearing, the combination with a spindle, of two pinions loose thereon, a compound gear having large and small series of teeth meshing respectively with said two pinions, and mechanism connected with the spindle intermediate said pinions and including sliding pawls having beveled ends for connecting the pinions to the spindle for either fast or slow movement in either or both directions.

2. In change speed gearing, the combination with a spindle, of two pinions loose thereon, a compound gear having large and small series of teeth meshing respectively with said two pinions, a barrel secured to the spindle between said two pinions, and pawls and controlling devices carried by said barrel for controlling both the speed and the character of the motion imparted to said spindle.

3. In change speed gearing, the combination with a spindle, of a compound gear having two series of teeth, two pinions loose on the spindle and in mesh with the two series of teeth at the same side of the axis of said compound gear whereby rotation of said gear will rotate both pinions simultaneously in the same direction, the opposing faces of the pinions having ratchet teeth, a barrel secured to the spindle between said pinions, a pair of oppositely beveled pawls for each pinion carried by said barrel, and means for selectively rendering said pawls active or inactive.

4. In change speed gearing, the combination with a spindle, of two pinions loose thereon, a compound gear having large and small series of teeth meshing respectively with said two pinions, a barrel secured to the spindle between said two pinions, two pairs of pawls mounted to slide longitudinally of said barrel, and a rotatable cam ring for controlling said pawls.

5. In change speed gearing, the combination with a spindle, of two pinions loose thereon, a compound gear having large and small series of teeth meshing respectively with said two pinions, a barrel secured to the spindle between said two pinions, two pairs of pawls mounted to slide longitudinally of said barrel, one pair of pawls being adapted to be projected from one end of the barrel and the other pair from the other end of said barrel, and a rotatable cam ring for controlling said pawls.

6. In change speed gearing, the combination with a spindle, of two pinions loose thereon, a compound gear having large and small series of teeth meshing respectively with said two pinions, a barrel secured to the spindle between said two pinions, two pairs of pawls mounted to slide longitudinally of the barrel, a cap ring and a base ring secured to opposite ends of said barrel, and a sleeve mounted on the barrel between the cap ring and base ring and having cam-shaped edges, each pawl having a pin engaging an edge of said sleeve, and having a spring to keep said pin in engagement with said edge.

In testimony whereof I have affixed my signature, in presence of two witnesses.

HENRY A. RYTHER.

Witnesses:
LIZZIE B. STRACHAN,
HARRIET M. DUDLEY.